(12) United States Patent
Kakani (10) Patent No.: US 7,751,396 B2
(45) Date of Patent: Jul. 6, 2010

(54) MULTICAST ADDRESS SIGNALING FOR POWER SAVE DELIVERY IN A WIRELESS NETWORK

(75) Inventor: Naveen K. Kakani, Irving, TX (US)

(73) Assignee: Nokia Corporation, Espoo (FI)

( * ) Notice: Subject to any disclaimer, the term of this patent is extended or adjusted under 35 U.S.C. 154(b) by 320 days.

(21) Appl. No.: 11/709,410

(22) Filed: Feb. 22, 2007

(65) Prior Publication Data

US 2007/0201467 A1    Aug. 30, 2007

Related U.S. Application Data

(60) Provisional application No. 60/777,619, filed on Feb. 28, 2006.

(51) Int. Cl.
*H04L 12/28* (2006.01)
*H04L 12/56* (2006.01)
*H04W 24/00* (2009.01)

(52) U.S. Cl. .................... 370/390; 370/392; 370/395.4; 455/456.4

(58) Field of Classification Search ........................ None
See application file for complete search history.

(56) References Cited

U.S. PATENT DOCUMENTS

| | | | |
|---|---|---|---|
| 5,583,866 | A | 12/1996 | Vook et al. |
| 6,795,450 | B1 * | 9/2004 | Mills et al. .................. 370/463 |
| 2004/0047293 | A1 | 3/2004 | Arrakoski |
| 2004/0213191 | A1 | 10/2004 | Lee |
| 2005/0047356 | A1 | 3/2005 | Fujii et al. |
| 2005/0135317 | A1 | 6/2005 | Ware et al. |
| 2005/0213576 | A1 | 9/2005 | Stephens |
| 2005/0254444 | A1 | 11/2005 | Meier et al. |

(Continued)

FOREIGN PATENT DOCUMENTS

WO    2004012493 A2    2/2004

(Continued)

OTHER PUBLICATIONS

"Draft Amendment to Standard [FOR] Information Technology", Telecommunications and information exchange between systems—Local and Metropolitan networks—Specific requirements—Part 11: Wireless LAN Medium Access Control (MAC) and Physical Layer (PHY) specifications: Enhancements for Higher Throughput, IEEE P802.11n/D0.01, Jan. 2006.

(Continued)

*Primary Examiner*—Gregory B Sefcheck
*Assistant Examiner*—Ashley L Shivers
(74) *Attorney, Agent, or Firm*—Brake Hughes Bellermann LLP (57) ABSTRACT

Various embodiments are disclosed relating to multicast address signaling for power save delivery in a wireless network. According to an example embodiment, a wireless node may transmit a management frame (e.g., a PSMP frame) to identify a scheduled data transmission time for one or more receiver nodes in a wireless network. The management frame, for example, may include a number of fields relating to a multicast transmission, such as one or more of a first field set to a value indicating a multicast transmission, a second field identifying a multicast address, a third field identifying a time for the multicast transmission, and a fourth field identifying a duration for the multicast transmission.

17 Claims, 8 Drawing Sheets

U.S. PATENT DOCUMENTS

2007/0115905 A1     5/2007    Jokela et al.
2007/0189207 A1*   8/2007    Sammour et al. ........... 370/328

FOREIGN PATENT DOCUMENTS

WO           2007099435 A2     9/2007

OTHER PUBLICATIONS

"Draft Amendment to Standard [FOR] Information Technology", Telecommunications and information exchange between systems—Local and Metropolitan networks—Specific requirements—Part 11: Wireless LAN Medium Access Control (MAC) and Physical Layer (PHY) specifications: Enhancements for Higher Throughput, IEEE P802.11n/D.

Katz, D. "A Proposed Standard for the Transmission of IP Datagrams over FDDI Networks", (Oct. 1990).

Crawford, M. "Transmission of IPv6 Packets over Ethernet Networks", (Dec. 1998).

Lim, L. W., et al., "A QoS Scheduler for IEEE 802.11e WLANs", (2004),199-204.

International Search Report and Written Opinion for corresponding application # PCT/IB2007/000478, (Sep. 21, 2007),14 Pgs.

Liu, Jinshan, et al. "QoS-aware Service Location in Mobile Ad-Hoc Networks", Proceedings of the 5th International Conference on Mobile Data Management, Jan. 2004, pp. 224-235.

Lim, L. W. et al., "A QoS Scheduler for IEEE 802.11e WLANs", First IEEE Consumer Communications and Networking Conference, 2004, pp. 199-204.

Office Action for Russian Patent Application No. 2008132689 (with English Translation), mailed on Dec. 10, 2009, 17 pages.

Office Action for Korean Application No. 10-2008-7019488 (includes English Translation), mailed Feb. 24, 2010, 6 pages.

Stephens, A., et al., "Joint Proposal: High throughput extension to the 802.11 Standard: MAC", IEEE P802.11 Wireless LANs, IEEE 802.11-05/1095r5, Jan. 13, 2006, 104 pages.

* cited by examiner

```
┌─────────────────────────────────────────────────────────────┐ ⟋410
│ Transmitting in a wireless network a power save multi poll (PSMP) frame │
│ (e.g., an IEEE 802.11n PSMP frame) to identify one or more parameters │
│ relating to a multicast transmission to be transmitted, the PSMP frame │
│ including:                                                   │
│         a first field set to a value indicating a multicast transmission; │
│         a second field identifying a multicast address ;    │
│         a third field (e.g., a downlink transmission (DLT) start offset field) │
│ identifying a time for the multicast transmission; and      │
│         a fourth field (e.g., a downlink transmission (DLT) duration field ) │
│ identifying a duration for the multicast transmission.      │
│                                                             │
└─────────────────────────────────────────────────────────────┘
```

| STA INFO Type 812 (indicating Unicast) | PSMP-DTT Start-Offset 814 | PSMP-DTT Duration 816 | STA_ID 818 | PSMP-UTT Start Offset 820 | PSMP-UTT Duration 822 |

810 - STA Info field for Unicast (or individually addressed) transmissions

FIG. 8A

| STA INFO Type 822 (indicating Broadcast) | PSMP-DTT Start-Offset 824 | PSMP-DTT Duration 826 |

820 - STA Info field for Broadcast downlink transmissions

FIG. 8B

| STA INFO Type 832 (indicating Multicast) | PSMP-DTT Start-Offset 834 | PSMP-DTT Duration 836 | PSMP-Multicast ID (or Multicast Group Address) 838 |

830 - STA Info field for Multicast downlink transmissions

FIG. 8C

MULTICAST ADDRESS SIGNALING FOR POWER SAVE DELIVERY IN A WIRELESS NETWORK

This application claims priority based on U.S. Provisional Application No. 60/777,619, filed on Feb. 28, 2006, entitled, "MULTICAST ADDRESS SIGNALING FOR POWER SAVE DELIVERY IN A WIRELESS NETWORK," the disclosure of which is hereby incorporated by reference.

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. A number of different 802.11 task groups are involved in developing specifications relating to improvements to the existing 802.11 technology. The IEEE 802.11 n task group has developed a High Throughput (HT) draft specification, entitled "Wireless LAN Medium Access Control (MAC) and Physical Layer (PHY) specifications: Enhancements for Higher Throughput," IEEE 802.11n.D0.01, January 2006.

The 802.11n HT draft specification has proposed the use of a Power Save Multi Poll (PSMP) management frame, which is a MAC control frame that may be used by an AP to provide a data transmission schedule (e.g., time and duration for uplink and/or downlink transmissions) to one or more PSMP receiver nodes. However, the 802.11n PSMP frame provides inadequate support for multicast data transmissions.

SUMMARY

Various embodiments are disclosed relating to multicast address signaling for power save delivery in a wireless network.

According to an example embodiment, a wireless node may transmit a management frame (e.g., a PSMP frame) to identify a scheduled data transmission time and direction (e.g., uplink and/or downlink) for each of the one or more receiver nodes in a wireless network. The management frame may include at least one multi-purpose field to provide information related to a scheduled unicast data transmission and alternatively to identify a multicast address for a scheduled multicast data transmission.

According to another example embodiment, a PSMP frame may be transmitted in a wireless network to identify one or more parameters relating to a multicast transmission to be transmitted. The PSMP frame may include a first field set to a value indicating a multicast transmission, a second field identifying a multicast address, a third field identifying a time (e.g., a DLT start offset) for the multicast transmission, and a fourth field identifying a duration (e.g., a DLT duration) for the multicast transmission.

According to another example embodiment, an apparatus may be provided in a wireless node of a wireless network. This apparatus may comprise a controller, a memory coupled to the controller, and a wireless transceiver coupled to the controller. The apparatus may be adapted to transmit a management frame to identify a scheduled data transmission time and direction for each of one or more receiver nodes in the wireless network. The management frame may include at least one multi-purpose field. The at least one multi-purpose field may provide information related to a scheduled unicast data transmission and alternatively to identify a multicast address for a scheduled multicast data transmission.

According to another example embodiment, an apparatus may be provided in a wireless node of a wireless network. The apparatus may be configured to transmit a broadcast management frame to identify a scheduled multicast data transmission time. The broadcast management frame may include a first field set to a value indicating multicast, a second field identifying a selected one of a plurality of possible multicast addresses, a downlink transmission start offset indicating a time for the multicast data transmission, and a downlink transmission duration indicating a duration for the multicast data transmission.

According to another example embodiment, an apparatus may be provided which includes a computing device and instructions. When executed on the computing device, the instructions may cause the computing device to establish a data transmission schedule with one or more receiver nodes in a wireless network, and to transmit a management frame at a time during the data transmission schedule to the one or more receiver nodes to identify a data transmission sub-schedule. The management frame may include at least one dual purpose field. The dual purpose field may provide information related to a scheduled unicast data transmission and alternatively to identify a multicast address for a scheduled multicast data transmission.

According to another example embodiment, an article may be provided which includes a storage medium. The storage medium may include instructions stored thereon that, when executed by a processor, result in transmitting a management frame to identify a scheduled data transmission time and direction for each of one or more receiver nodes in a wireless network. The management frame may include at least one multi-purpose field. The multi-purpose field may provide information related to a scheduled unicast data transmission and alternatively to identify a multicast address for a scheduled multicast data transmission.

According to another example embodiment, an apparatus at a wireless node may be provided including a controller. The controller may be programmed to transmit a broadcast management frame to identify a scheduled multicast data transmission time, the management frame including a first field set to a value indicating multicast, a second field identifying a selected one of a plurality of possible multicast addresses, a downlink transmission start offset indicating a time for the multicast data transmission, and a downlink transmission duration indicating a duration for the multicast data transmission.

According to another example embodiment, an apparatus may be provided for wireless communication via a wireless network. The apparatus may include a computing device (e.g., controller or processor), and instructions that when executed on the computing device cause the computing device to: establish a data transmission schedule with one or more receiver nodes in a wireless network, and transmit a management (e.g., PSMP) frame to the one or more receiver nodes to identify a data transmission sub-schedule.

The management frame may include a unicast information field for each of one or more unicast transmissions, the unicast information field including at least a station ID, a downlink transmission time or start offset for the unicast transmission, and a downlink transmission duration for the unicast transmission; and a multicast information field for a multicast transmission, the multicast information field including a field indicating multicast, a downlink transmission time or start offset for the multicast transmission, a downlink transmission duration for the multicast transmission, and a multicast address.

According to another example embodiment, a method may include transmitting a management frame via a wireless network to indicate a data transmission schedule for one or more wireless receiver nodes or stations. The management frame may include a unicast information field for each of one or more unicast transmissions, the unicast information field including at least a station ID, a downlink transmission time or start offset for the unicast transmission, and a downlink transmission duration for the unicast transmission; and a multicast information field for a multicast transmission, the multicast information field including a field indicating multicast, a downlink transmission time or start offset for the multicast transmission, a downlink transmission duration for the multicast transmission, and a multicast address.

According to another example embodiment, an article may include a storage medium, the storage medium including instructions stored thereon that, when executed by a processor or controller result in: transmitting a management frame via a wireless network to indicate a data transmission schedule for one or more wireless receiver nodes or stations. The management frame may include a unicast information field for each of one or more unicast transmissions, the unicast information field including at least a station ID, a downlink transmission time or start offset for the unicast transmission, and a downlink transmission duration for the unicast transmission; and a multicast information field for a multicast transmission, the multicast information field including a field indicating multicast, a downlink transmission time or start offset for the multicast transmission, a downlink transmission duration for the multicast transmission, and a multicast address.

In yet another example embodiment, an apparatus may include a wireless transceiver and a controller. The controller may be configured to: transmit a management frame via a wireless network to indicate a data transmission schedule for one or more wireless receiver nodes or stations. The management frame may include a unicast information field for each of one or more unicast transmissions, the unicast information field including at least a station ID, a downlink transmission time or start offset for the unicast transmission, and a downlink transmission duration for the unicast transmission; and a multicast information field for a multicast transmission, the multicast information field including a field indicating multicast, a downlink transmission time or start offset for the multicast transmission, a downlink transmission duration for the multicast transmission, and a multicast address.

The details of one or more implementations are set forth in the accompanying drawings and the description below. Other features will be apparent from the description and drawings, and from the claims.

DETAILED DESCRIPTION

Figure 1:
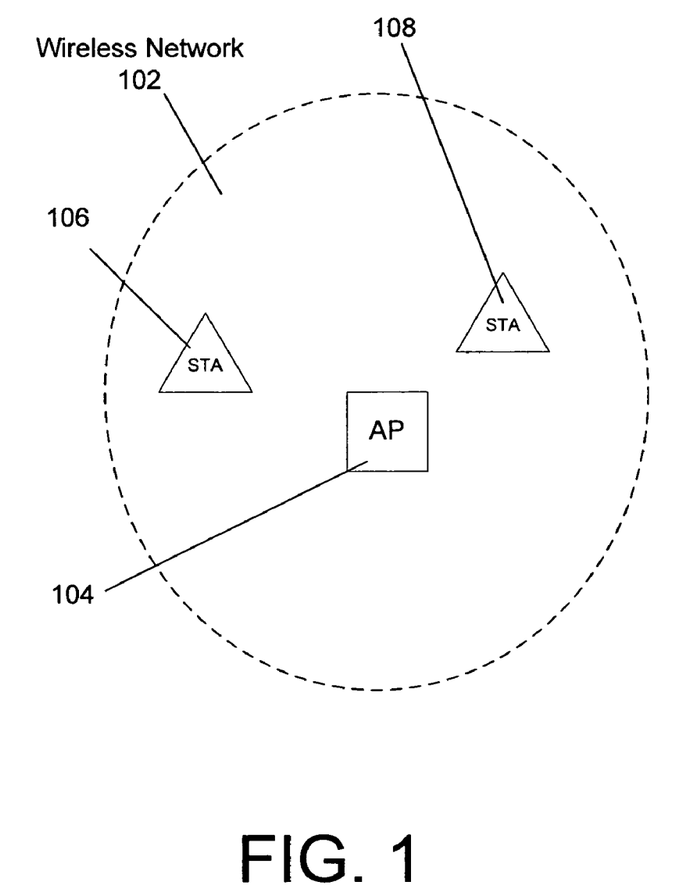
FIG. 1 is a block diagram illustrating a wireless network according to an example embodiment.

Referring to the Figures in which like numerals indicate like elements, FIG. 1 is a block diagram illustrating a wireless network according to an example embodiment. Wireless network 102 may include a number of wireless nodes or stations, such as an access point (AP) 104 or base station and one or more mobile stations, such as stations 106 and 108. While only one AP 104 and two mobile stations 106, 108 are shown in wireless network 102, any number of APs and stations may be provided. Each station in network 102 (e.g., stations 106, 108) may be in wireless communication with the AP 104, and may even be in direct communication with each other. Although not shown, AP 104 may be coupled to a fixed network, such as a Local Area Network (LAN), Wide Area Network (WAN), the Internet, etc., and may also be coupled to other wireless networks.

The various embodiments described herein may be applicable to a wide variety of networks and technologies, such as WLAN networks (e.g., IEEE 802.11 type networks), IEEE 802.16 WiMAX networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

The term "wireless node" or "node," or the like, may include, for example, a wireless station, an access point (AP) or base station, a wireless personal digital assistant (PDA), a cell phone, an 802.11 WLAN phone, a wireless mesh point, or any other wireless device. These are merely a few examples of the wireless devices that may be used to implement the various embodiments described herein, and this disclosure is not limited thereto.

In an example embodiment, a wireless node (e.g., AP 104 or station 106, 108) may determine capabilities of other nodes by receiving a capabilities field (e.g., indicating whether the node is PSMP capable or not) in a beacon message or probe response (e.g., from an AP) and via an association request or re-association request (e.g., from a station), for example. An AP 104 may associate with one or more wireless stations 106, 108 or nodes. The PSMP capable stations 106, 108 may be referred to as PSMP receivers (to receive a PSMP frame) or PSMP receiver nodes, while the AP 104 may be referred to as a PSMP transmitter.

After a station 106 is associated with an AP 104, the two nodes may establish a data transmission schedule, indicating a service period, by exchanging one or more frames or messages indicating a schedule start time for the service period. A variety of different mechanisms may be used to exchange or agree on a time for a service period. For example, the IEEE 802.11e draft specification allows for power management through automatic power-save delivery (APSD). APSD provides two delivery mechanisms: scheduled APSD and unscheduled APSD. Stations 106, 108 may use unscheduled APSD (U-APSD) to have all or some of their frames delivered to them from the AP 104 during unscheduled service periods. An unscheduled service period may begin when the AP 104 receives a trigger message from the station 106. According to scheduled APSD (S-APSD), a station 106 may receive a data transmission schedule from an AP 104 indicating a service start time and service interval when the station may receive and transmit frames during scheduled service periods. For example, by using APSD, a station 106 may conserve power and extend battery life by remaining in a lower power state, and then waking during a scheduled or unscheduled service period to receive and transmit data.

In an example embodiment, an AP 104 may allocate the same service period for multiple stations 106, 108 or nodes, which may require each of these multiple stations 106, 108 to be awake during a substantial portion of (or even all of) the service period in some cases, as examples. The PSMP frame (example frame shown in FIG. 2) may allow an AP 104 to provide sub-schedules to each of a plurality of stations 106, 108. These PSMP data transmission schedules, or sub-schedules, may indicate for example a downlink start time and duration (for a scheduled transmission from the AP 104 to a specified station 106), and/or an uplink start time and duration (for a scheduled transmission time where a specified station may be permitted to transmit data to the AP 104). The PSMP frame, which may include a DLT (downlink transmission) and/or ULT (uplink transmission) schedules, may be transmitted according to the S-APSD service period, for an U-APSD, or may be transmitted at any time (e.g., during unscheduled periods).

Figure 2:
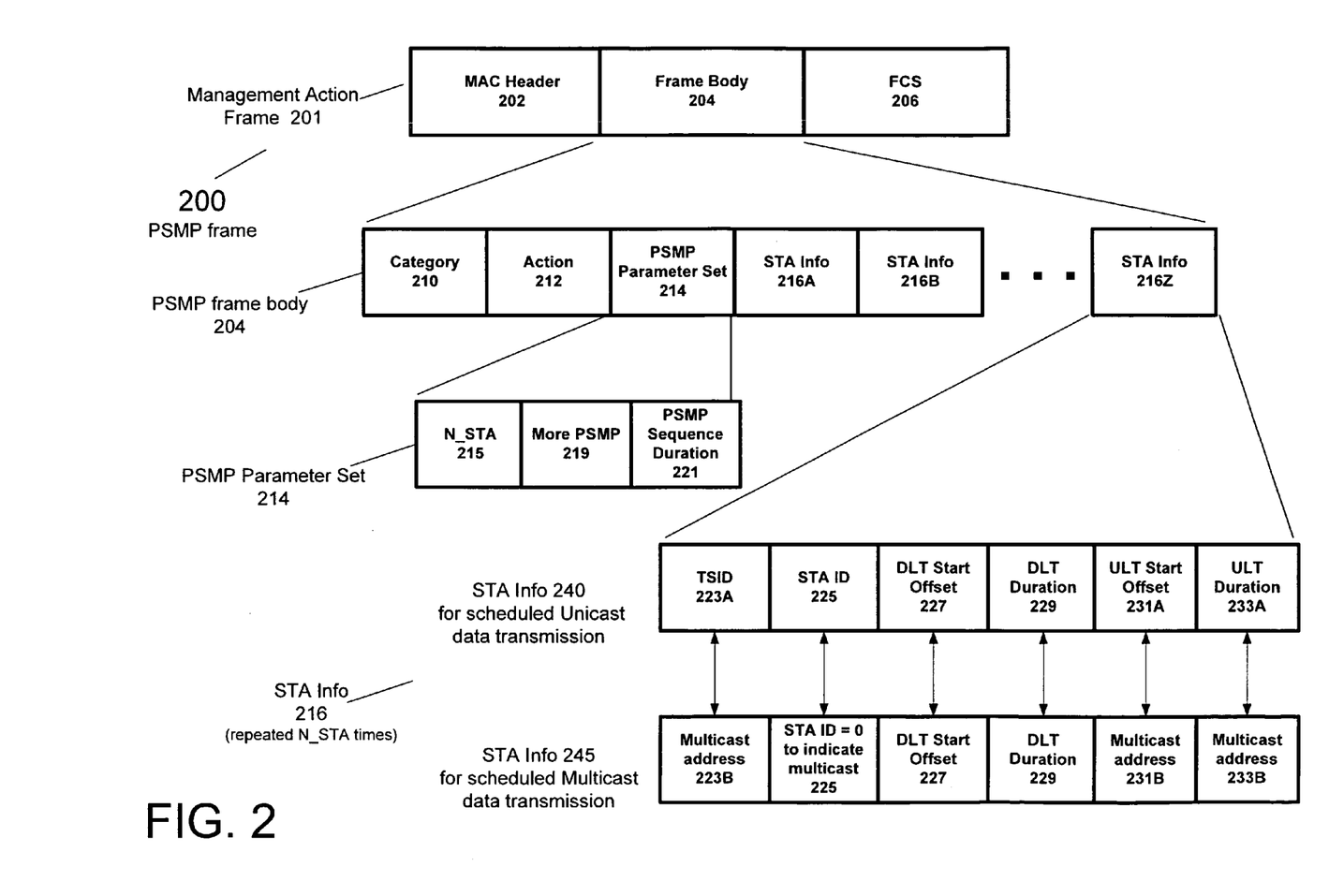
FIG. 2 is a diagram illustrating a format of a multi poll message, such as a Power Save Multi Poll (PSMP) management frame, according to an example embodiment.

FIG. 2 is a diagram illustrating a format of a multi poll message, such as an IEEE 802.11n Power Save Multi Poll (PSMP) management frame 200, according to an example embodiment. The frame shown in FIG. 2 is merely an example format for a management frame, such as for a PSMP frame. One or more fields may be omitted, and the frame may include additional fields, and/or the fields may be in any order and/or one or more of the fields may be known by different names.

Management action frame 201 may include a MAC header 202 that may include MAC address information and other fields, a frame body 204, and a frame check sequence (FCS) 206, for example. In an example embodiment, frame body 204 may be a Power Save Multi Poll (PSMP) frame body. The frame body 204 may include a category field 210 set to a value indicating High Throughput (HT) (e.g., HT related frame), for example. Frame body 204 may also include an Action field 212 set to a value indicating a PSMP frame.

Frame body 204 may also include a PSMP parameter set 214 and one or more station information fields (STA Info fields) 216. PSMP parameter set 214 may include a number of stations (N_STA) field 215 indicating a number of station information fields (STA Info fields) present in the frame body 204. A More PSMP field 219 may be set to a 1, for example, to indicate that this PSMP sequence will be followed by another PSMP sequence, and set to 0 to indicate that this is the last PSMP sequence during this service period. A PSMP sequence may include, for example, a PSMP frame followed by a scheduled data transmission to (downlink) and/or from (uplink) one or more stations, as indicated by the PSMP frame. PSMP sequence duration field 221 indicates the duration of the current PSMP sequence which is described by the PSMP frame.

As noted above, an AP 104 may transmit to a plurality of stations 106, 108 and/or receive from a plurality of stations 106, 108, according to the information provided in the one or more station information (STA Info) fields 216. A STA Info field 216 may be provided for each station 106 for which uplink and/or downlink transmission is being scheduled by the PSMP message (for the current PSMP sequence). The number of STA Info fields 216 is indicated by the N_STA field 215. Therefore, the PSMP frame body 204 illustrated in FIG. 2 may include one or more STA Info fields 216, such as STA Info fields 216A, 216B, . . . 216Z, as an example.

Each STA Info field 216 may include a plurality of fields. According to an example embodiment, one or more of these fields in the STA Info field 216 may be a multi-purpose field (e.g., performing a first purpose related to communicating a scheduled unicast data transmission, and performing a second purpose related to communicating a scheduled multicast transmission). For example, one or more of these fields may provide a first type of information for a scheduled unicast data transmission (e.g., a transmission to/from a single node), and may provide a second (different) type of information for a scheduled multicast (to multiple stations) data transmission. This may allow for efficient re-use of one or more fields of the STA Info field 216 to accommodate both unicast and multicast. Thus, according to an example embodiment, a same STA Info field 216 may be used by PSMP frame 204 to provide schedule information for both a unicast and multicast data transmissions, where one or more sub-fields within the STA Info field 216 may have different (or multiple) meanings or provide different types of information (e.g., a first meaning for unicast, and a second meaning for multicast).

In an example embodiment, mobile multimedia/TV or video applications may allow multiple stations 106, 108 or nodes to be grouped together to receive a common channel they are watching, e.g., by associating this group of stations 106, 108 watching the channel with a multicast address. This may allow each of the stations 106, 108 or wireless nodes to receive this TV program or video information via multicast transmission, for example. This is merely one example application, and the various techniques and embodiments described herein may be applied to a wide variety of applications.

In FIG. 2, according to one example embodiment, the various fields of an STA Info field 216 are shown, for example, as two possible meanings of each of the fields, with STA info 240 indicating example fields to describe a scheduled unicast data transmission, and STA Info field 245 indicating example fields to describe a scheduled multicast data transmission (e.g., which may re-use one or more fields from STA Info field 240).

The STA Info field (216) for a unicast data transmission (240) may include a traffic stream identifier (TSID) field 223A, which may identify one or more TSIDs that a station 106 may or should use for transmitting data back to the AP 104 for a scheduled uplink data transmission. However, according to an example embodiment, the TSID field 223A may apply for a unicast transmission in the uplink direction, and this TSID field 223A may not necessarily be applicable for a multicast transmission (which is typically a downlink transmission). Thus, according to an example embodiment, the TSID field 223 may be re-used for a multicast transmission to identify a multicast address, shown as multicast address 223B in STA Info field 245. According to an example embodiment, the TSID field may be omitted, for example.

In STA Info field 240, a station identifier (STA ID) field 225 may identify the station 106 (e.g., using either a portion of a MAC address of the station 106 or the Association ID for the station 106). In an example embodiment, the STA ID field 225 in STA Info field 245 may be set to zero to indicate a multicast transmission. In addition, STA ID field 225 may also be set to all 1's to indicate a broadcast transmission.

The downlink transmission (DLT) start offset field 227 may indicate a start time for the scheduled downlink data transmission (from AP 104 to station 106), and a downlink transmission (DLT) duration field 229 may indicate a duration for the downlink transmission. These DLT related fields (227, 229) may be applicable for both a unicast transmission and a multicast transmission (multicast may be, for example, a downlink data transmission from the AP 104 to multiple stations 106, 108). Therefore, both of the DLT related fields (227, 229) may be included in the STA Info field 240 to communicate information related to a scheduled unicast data transmission as well as for the STA Info field 245 to communicate information related to a scheduled multicast data transmission (which may typically be a downlink transmission).

An uplink transmission (ULT) (from station 106 to AP 104) start offset field 231A and a ULT duration field 233A are provided for the STA Info field 240 for unicast data transmission, but may not be applicable for a multicast transmission (since multicast may typically be considered to be downlink in an example embodiment). Thus, one or more of the two ULT related fields (231A, 233A) may be re-used to communicate a multicast address for a scheduled multicast data transmission, shown as multicast address fields 231B and 233B.

Thus, one or more fields (e.g., one or more of TSID 223A, ULT start offset 231A, ULT duration 233A or other field) may each have multiple purposes, depending on whether the scheduled transmission is unicast or multicast. In this manner, one or more fields that may not be applicable to multicast or may not typically be used to describe a multicast transmission may be used to communicate or provide a multicast address for a scheduled multicast transmission. In an example embodiment, this multicast address may be provided using existing fields (typically used to describe a unicast transmission), without providing a dedicated multicast address field, for example, although the disclosure is not limited thereto. The various embodiments may be applied both to ad-hoc mode (e.g., one station 106 multicasting to multiple other wireless stations 106, 108) and infrastructure mode (AP 104 multicasting to wireless stations 106, 108).

In an alternative embodiment, a PSMP frame 200 may be transmitted either during ad-hoc mode (e.g., a station multicasting to other stations) or for infrastructure mode. In this alternative embodiment, the PSMP frame 200 may include multiple STA Info fields 216. In the first STA Info field 216, the TSID field 223 may be set to all 1s indicating a poll frame, the STA ID field 225 may be set to 0 indicating a multicast transmission schedule (and multicast frame), and one or more of the DLT and ULT fields may be used to provide the multicast address. Subsequent STA Info Fields 216 may provide information only for the one or more receiver nodes that are part of the multicast group, for example. Each of these station specific STA Info fields 216 may set STA ID to the AID (infrastructure mode) or portion of MAC address (for ad-hoc mode) of the receiver node in the multicast group, TSID may be a don't care, the ULT fields may be set to a time and duration to allow the receiver node to transmit acknowledgements to acknowledge receipt of multicast data frames, and the DLT fields may alternatively be used to provide a schedule (e.g., start time and duration) for unicast data transmission to the receiver node. Note in this example, a schedule for the multicast data transmissions may not necessarily be provided in the PSMP frame 200, since the multicast data transmissions may immediately follow (e.g., as a default scheduled transmission time) the transmission of the PSMP frame 200. This is merely another example embodiment, and the disclosure is not limited thereto.

Figure 3:
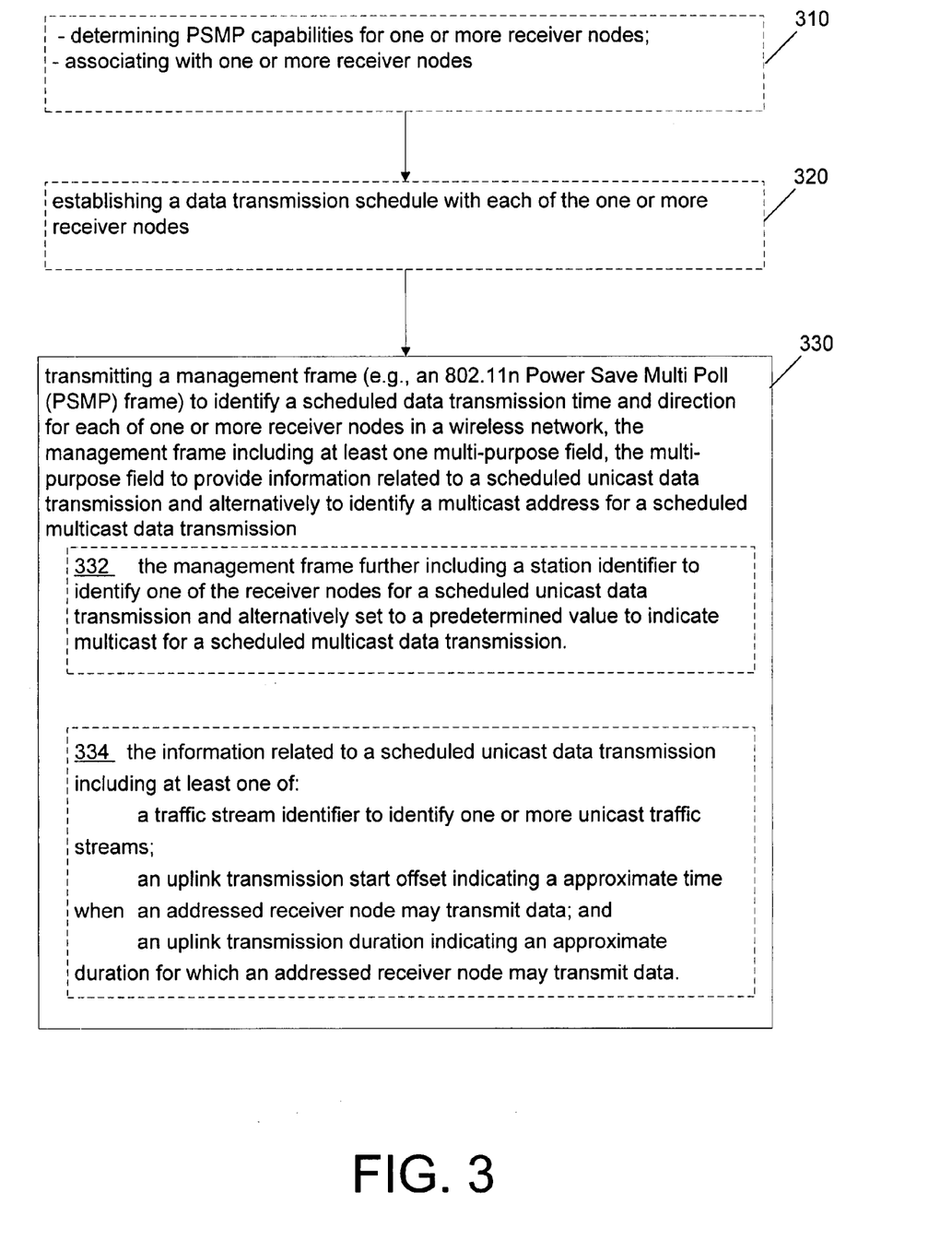
FIG. 3 is a flow chart illustrating operation of a wireless node according to an example embodiment.

FIG. 3 is a flow chart illustrating operation of a wireless node according to an example embodiment. At 310, an AP 104 may determine PSMP capabilities for one or more receiver nodes (e.g., stations 106). This may be performed by determining or exchanging capabilities information with other nodes in the wireless network 102. The AP 104 may also associate with one or more receiver nodes (e.g., stations 106).

At 320, a data transmission schedule may be established with each of one or more receiver nodes, e.g., by exchanging frames with the receiver nodes to establish a start time, etc., for a service period.

At 330, the AP 104 may transmit a management frame (e.g., 802.11n PSMP frame 200) to identify a scheduled data transmission time and direction (e.g., uplink and/or downlink) for each of the one or more receiver nodes in a wireless network 102. The management frame may include at least one multi-purpose field to provide information related to a scheduled unicast data transmission and alternatively set to a predetermined value to indicate multicast for a scheduled multicast data transmission.

In an example embodiment, at 332, the management frame may further include a station identifier to identify one of the receiver nodes for a scheduled unicast data transmission and alternatively set to a predetermined value to indicate multicast for a scheduled multicast data transmission.

In yet another example embodiment, at 334, the information related to a scheduled unicast data transmission may include at least one of 1) a traffic stream identifier to identify one or more unicast traffic streams, 2) an uplink transmission start offset indicating an approximate time when an addressed receiver node may transmit data, and 3) an uplink transmission duration indicating an approximate duration for which an addressed receiver node may transmit data.

Figure 4:
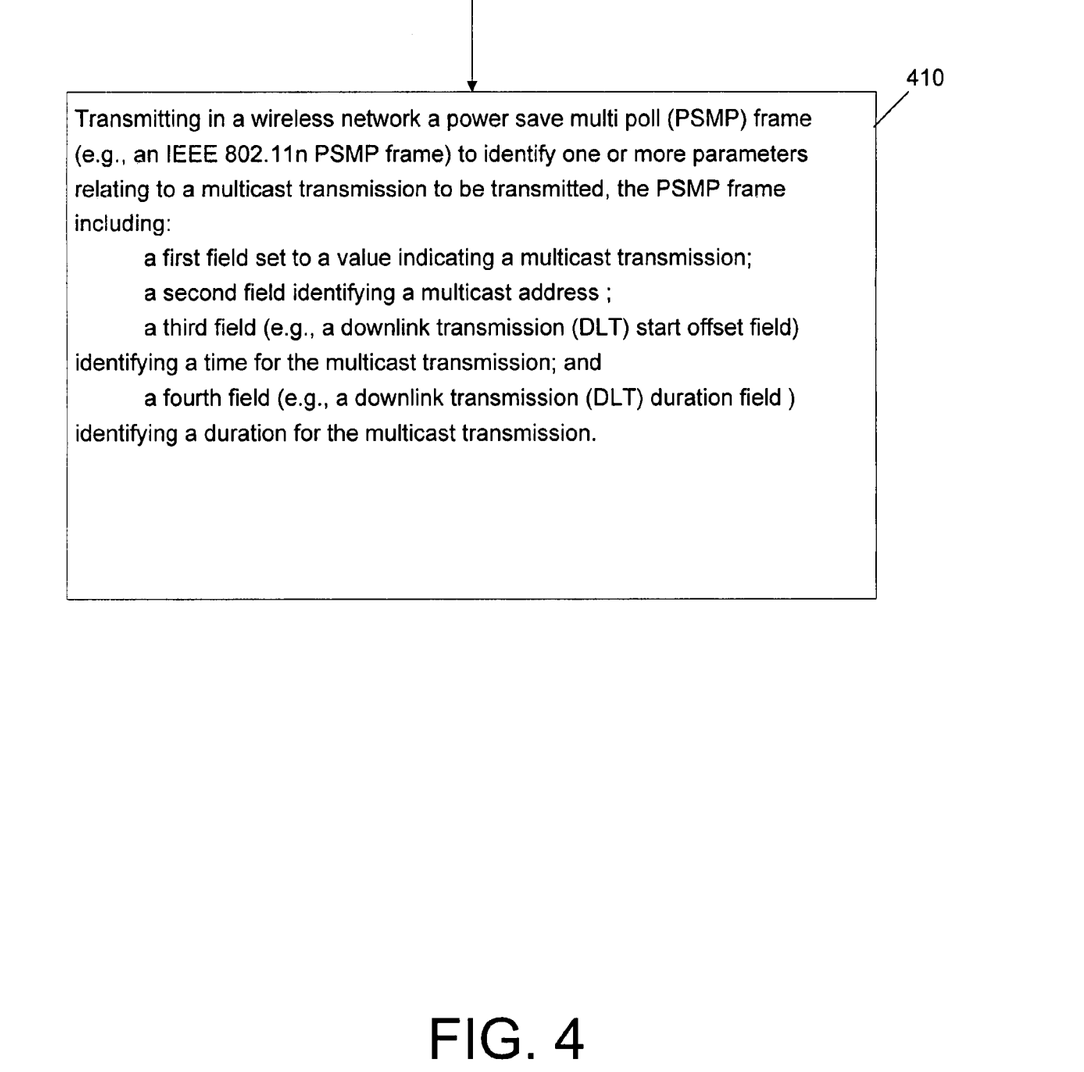
FIG. 4 is a flow chart illustrating operation of a wireless node according to another example embodiment.

FIG. 4 is a flow chart illustrating operation of a wireless node according to another example embodiment. At 410, a power save multi poll (PSMP) frame 200 (e.g., an IEEE 802.11n PSMP frame) may be transmitted in a wireless network 102 to identify one or more parameters relating to a scheduled multicast transmission to be transmitted, the PSMP frame 200 including a first field (e.g., a station identifier (STA ID) field 225, or STA Info Type field indicating multicast transmission) set to a value indicating a multicast transmission, a second field identifying a multicast address, a third field (e.g., a downlink transmission (DLT) start offset field 227) identifying a time for the multicast transmission, and a fourth field (e.g., a downlink transmission (DLT) duration field 229) identifying a duration for the multicast transmission.

Figure 5:
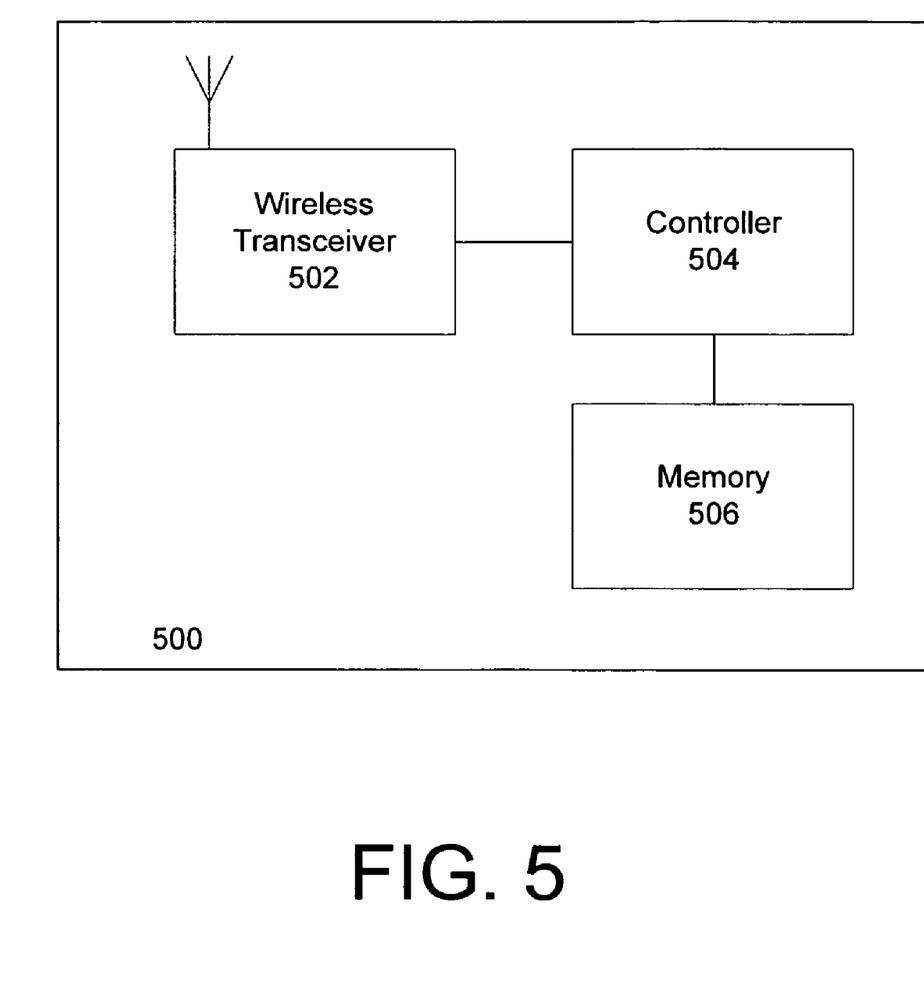
FIG. 5 is a block diagram illustrating an apparatus that may be provided in a wireless node according to an example embodiment.

FIG. 5 is a block diagram illustrating an apparatus 500 that may be provided in a wireless node according to an example embodiment. The wireless node (e.g. station 106 or AP 104) may include, for example, a wireless transceiver 502 to transmit and receive signals, a controller 504 to control operation of the station and execute instructions or software, and a memory 506 to store data and/or instructions.

When a wireless node receives a management frame such as the management action frame 201 shown in FIG. 2, it can determine whether it is to receive unicast traffic, multicast traffic, or both, based on the schedules determined by the PSMP frame 200. If a determination is made that no traffic is destined to the wireless station, the wireless station can conserve power and enter a low power state.

Controller 504 may be programmable and capable of executing software or other instructions stored in memory or on other computer media to perform the various tasks and functions described above. For example, controller 504 may be programmed to transmit a management frame to identify a scheduled data transmission time and direction for each of one or more receiver nodes in a wireless network, the management frame including at least one multi-purpose field. The at least one multi-purpose field may provide information related to a scheduled unicast data transmission, and may alternatively provide information to identify a multicast address for a scheduled multicast data transmission.

In another example embodiment, controller 504 may be programmed to transmit a broadcast management frame to identify a scheduled multicast data transmission time. The management frame may include a first field set to a value indicating multicast, a second field identifying a selected one of a plurality of possible multicast addresses, a downlink transmission start offset indicating a time for the multicast data transmission, and a downlink transmission duration indicating a duration for the multicast data transmission.

In another example embodiment, controller 504 may be programmed to establish a data transmission schedule with one or more receiver nodes in a wireless network. The controller 504 may also be programmed to transmit a management frame at a time during the data transmission schedule to the one or more receiver nodes to identify a data transmission sub-schedule, the management frame including at least one dual purpose field. The dual purpose field may provide information related to a scheduled unicast data transmission and alternatively to identify a multicast address for a scheduled multicast data transmission.

In addition, a storage medium may be provided that includes stored instructions, which when executed by a controller or processor may result in the controller 504, or other controller or processor, performing one or more of the functions or tasks described herein.

Figure 6:
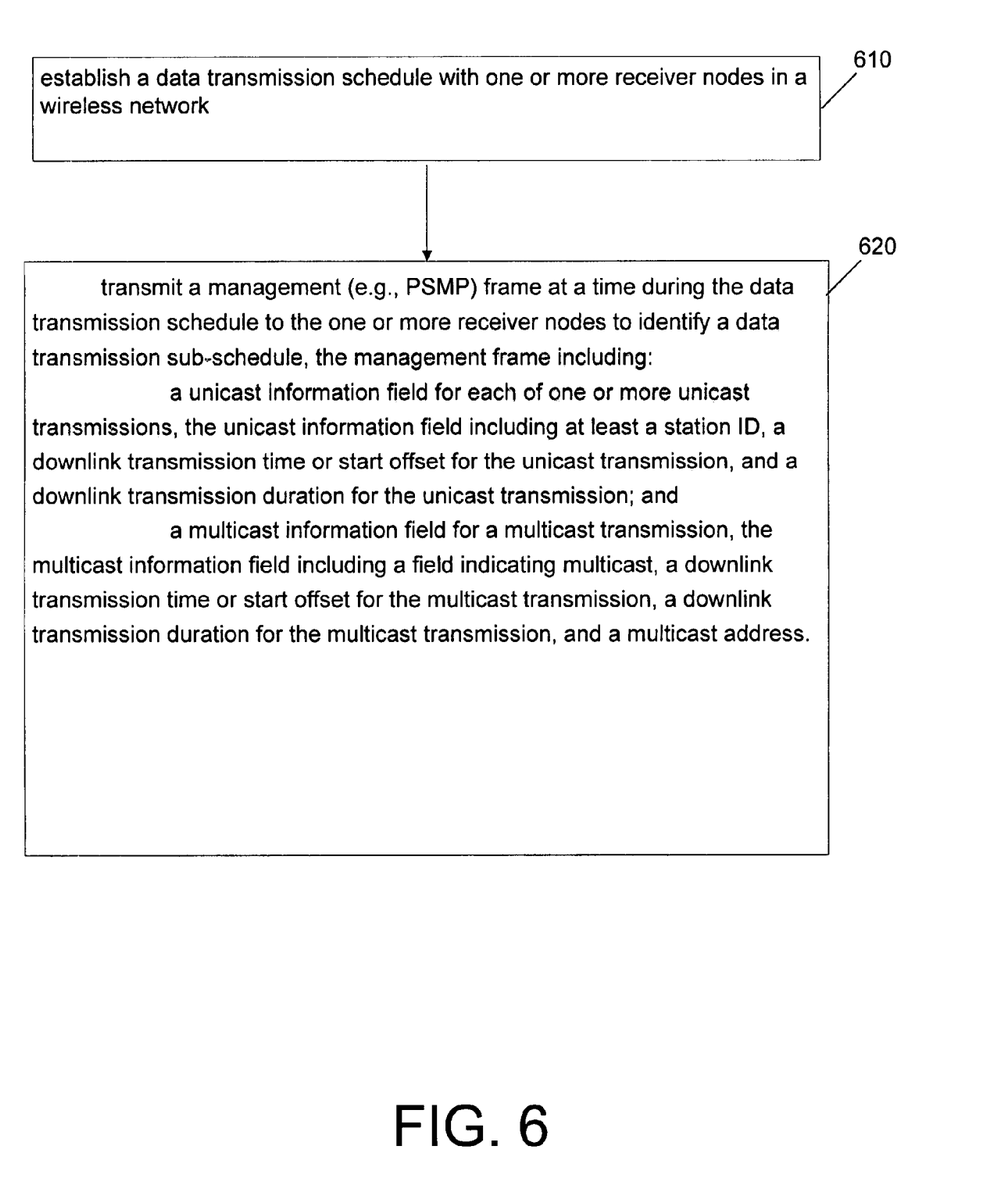
FIG. 6 is a flow chart illustrating operation of a wireless node according to another example embodiment.

FIG. 6 is a flow chart illustrating operation of a wireless node according to another example embodiment. At 610, a data transmission schedule may be established with one or more receiver nodes in a wireless network.

At 620, a management frame may be transmitted to the one or more receiver nodes to identify a data transmission sub-schedule.

The management frame may include a unicast information field for each of one or more unicast transmissions, the unicast information field including at least a station ID, a downlink transmission time or start offset for the unicast transmission, and a downlink transmission duration for the unicast transmission; and a multicast information field for a multicast transmission, the multicast information field including a field indicating multicast, a downlink transmission time or start offset for the multicast transmission, a downlink transmission duration for the multicast transmission, and a multicast address.

Figure 7:
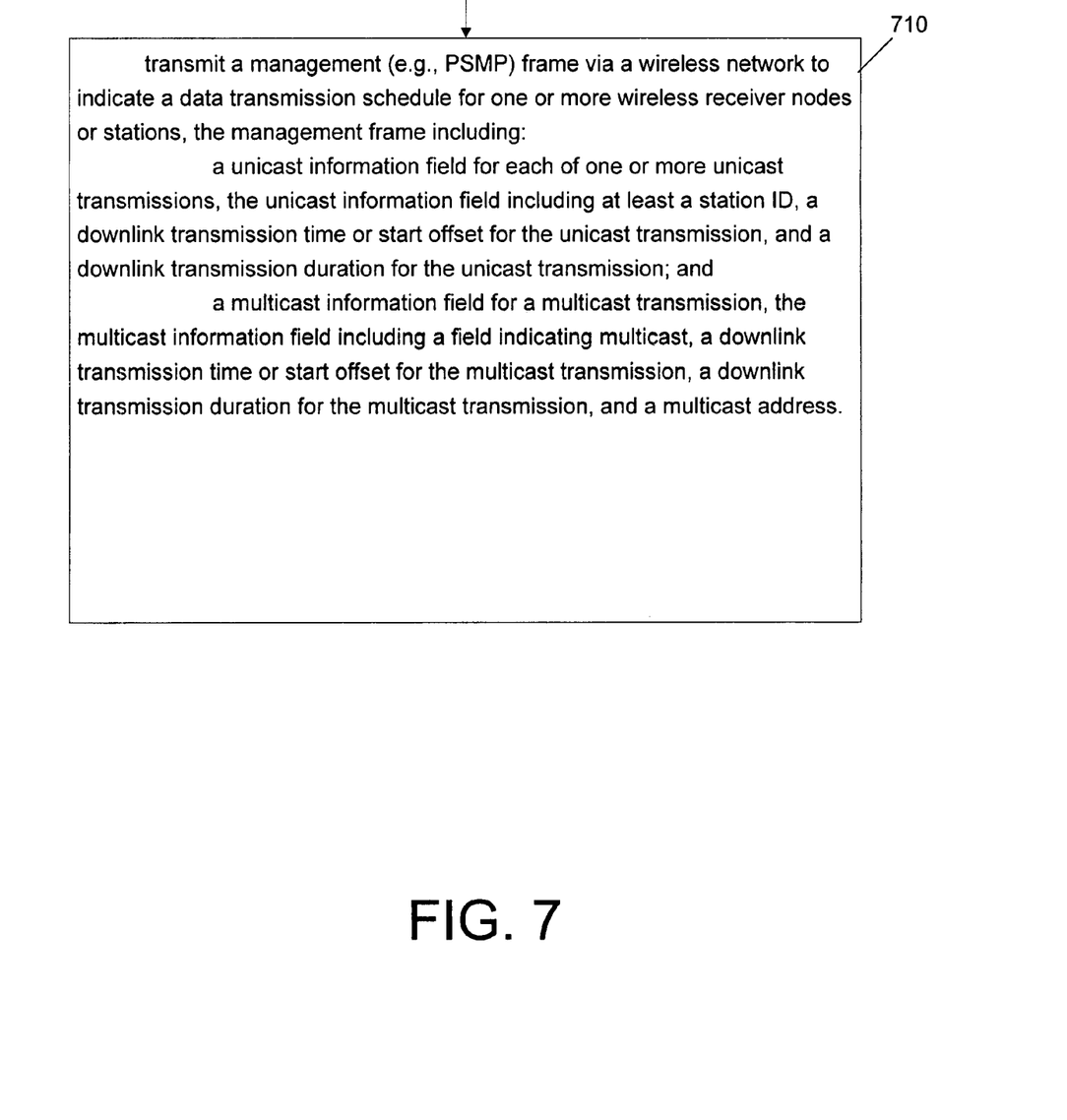
FIG. 7 is a flow chart illustrating operation of a wireless node according to yet another example embodiment.

FIG. 7 is a flow chart illustrating operation of a wireless node according to yet another example embodiment. At 710, a management frame may be transmitted via a wireless network to indicate a data transmission schedule for one or more wireless receiver nodes or stations. The management frame may include a unicast information field for each of one or more unicast transmissions, the unicast information field including at least a station ID, a downlink transmission time or start offset for the unicast transmission, and a downlink transmission duration for the unicast transmission; and a multicast information field for a multicast transmission, the multicast information field including a field indicating multicast, a downlink transmission time or start offset for the multicast transmission, a downlink transmission duration for the multicast transmission, and a multicast address.

Figure 8A:
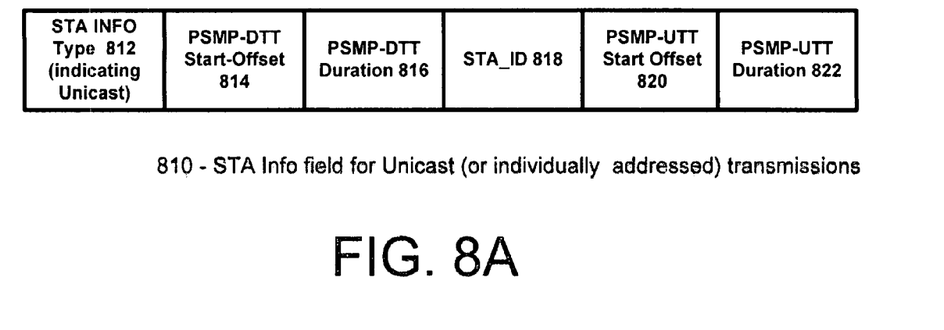
FIG. 8A is a diagram illustrating a format of a STA Info field for unicast transmissions according to an example embodiment.

FIG. 8A is a diagram illustrating a format of a STA Info field 810 for unicast transmissions according to an example embodiment. The unicast STA Info field 810 may include, for example, a STA Info Type set to a value indicating unicast, a PSMP downlink PSMP-DTT Start-Offset 814 indicating a transmission time (or start time), a PSMP-DTT duration 816 indicating a downlink transmission duration, a STA-ID field 818 identifying a station or wireless receiver node, a PSMP-UTT Start Offset 820 indicating a start time for uplink transmissions from the identified node to the AP or BS, and a PSMP-UTT duration 822 indicating the duration for the uplink transmission. A STA Info field 810 may be provided for each of the (or one or more of the) wireless receiver nodes being serviced by an AP or within a network, for example, to indicate scheduled unicast transmission times.

Figure 8B:
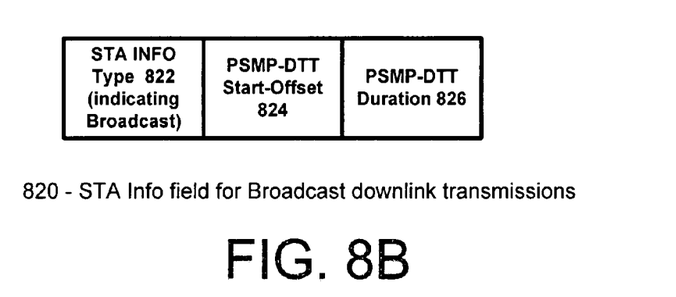
FIG. 8B is a diagram illustrating a format of a STA Info field for broadcast transmissions according to an example embodiment.

FIG. 8B is a diagram illustrating a format of a STA Info field 820 for broadcast transmissions according to an example embodiment. The STA Info filed 820 may include a STA Info type 822 set to a value indicating broadcast transmission, a PSMP-DTT Start Offset 824 indicating a start time for the broadcast transmission, and a PSMP-DTT duration 826 indicating a duration of the broadcast transmission.

Figure 8C:
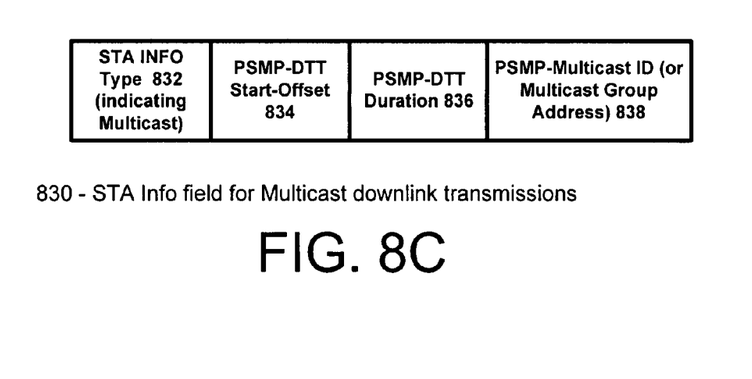
FIG. 8C is a diagram illustrating a format of a STA Info field for multicast transmissions according to an example embodiment.

FIG. 8C is a diagram illustrating a format of a STA Info field 830 for multicast transmissions according to an example embodiment. A STA Info type 832 may be set to a value indicating multicast (or multicast transmission), a PSMP-DTT Start Offset 834 indicating a start transmission time for this multicast transmission, a PSMP-DTT duration 836 indicating a duration of the multicast transmission, and a PSMP-Multicast ID 838 indicating a multicast ID or multicast address. The transmission schedule provided in the PSMP frame (e.g., within one or more STA Info fields) may describe one or more unicast transmissions, broadcast transmissions and/or multicast transmissions, which may typically follow the PSMP frame, for example.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
transmitting, by a wireless node in a wireless network, a Power save multi poll (PSMP) frame to identify one or more parameters relating to a multicast transmission to be transmitted, the PSMP frame comprising a plurality of station info fields, a station info field for the multicast transmisson comprising:
a first field set to a value indicating a multicast transmission;
a second field identifying a multicast address;
a third field identifying a time for the multicast transmission; and
a fourth field identifying a duration for the multicast transmission.

2. The method of claim 1, wherein the transmitting comprises:
transmitting in the wireless network the PSMP frame to identify one or more parameters relating to a scheduled multicast transmission to be transmitted in a PSMP sequence, the PSMP frame comprising:
the third field identifying the time for the multicast transmission during the PSMP sequence, the third field comprising a downlink transmission (DLT) start offset field; and
the fourth field identifying the duration for the multicast transmission, the fourth field comprising a downlink transmission (DLT) duration field.

3. The method of claim 1 wherein the transmitting in the wireless network the PSMP frame comprises transmitting in a wireless network an IEEE 802.11n PSMP frame.

4. An apparatus provided in a wireless node of a wireless network, the apparatus being configured to:
transmit a broadcast Power save multi poll (PSMP) frame to identify a scheduled multicast data transmission time, the broadcast PSMP frame comprising a plurality of station info fields, a station info field for the multicast transmisson comprising a first field set to a value indicating multicast, a second field identifying a selected one of a plurality of possible multicast addresses, a downlink transmission start offset indicating a time for the multicast data transmission, and a downlink transmission duration indicating a duration for the multicast data transmission.

5. The apparatus of claim 4, the apparatus being further configured to:
transmit one or more multicast data frames to the multicast address at approximately the time indicated by the downlink transmission start offset.

6. The apparatus of claim 4 wherein the broadcast PSMP frame comprises a IEEE 802.11n PSMP frame.

7. An apparatus provided for wireless communicate via a wireless network comprising:
a computing device; and
instructions that when executed on the computing device cause the computing device to:
establish a data transmission schedule with one or more receiver nodes in a wireless network; and
transmit a Power save multi poll (PSMP) frame to the one or more receiver nodes to identify a data transmission sub-schedule, the PSMP frame comprising:
a unicast information field for each of one or more unicast transmissions, the unicast information field comprising at least a station ID, a downlink transmission time or start offset for the unicast transmission, and a downlink transmission duration for the unicast transmission; and
a plurality of station info fields, a station info field for a multicast transmisson comprising a field indicating multicast, a downlink transmission time or start offset for the multicast transmission, a downlink transmission duration for the multicast transmission, and a multicast address.

8. The apparatus of claim 7 wherein the unicast information field comprises a STA Info field for unicast data transmission, the STA Info field for unicast data transmission being provided within an IEEE 802.11n PSMP frame.

9. The apparatus of claim 7 the STA Info field for multicast data transmission being provided within an IEEE 802.11n PSMP frame.

10. A method comprising:
transmitting, by a wireless node, a Power save multi poll (PSMP) frame via a wireless network to indicate a data transmission schedule for one or more wireless receiver nodes or stations, the PSMP frame comprising:
a unicast information field for each of one or more unicast transmissions, the unicast information field comprising at least a station ID, a downlink transmission time or start offset for the unicast transmission, and a downlink transmission duration for the unicast transmission; and
a plurality of station info fields, a station info field for a multicast transmisson comprising a field indicating multicast, a downlink transmission time or start offset for the multicast transmission, a downlink transmission duration for the multicast transmission, and a multicast address.

11. The method of claim 10 wherein the unicast information field includes a STA Info field for unicast data transmission.

12. The method of claim 10 wherein the transmitting comprises transmitting an IEEE 802.11n PSMP frame.

13. An article comprising:
a storage medium;
said storage medium comprising instructions stored thereon that, when executed by a processor, result in:
transmitting a Power save multi poll (PSMP) frame via a wireless network to indicate a data transmission schedule for one or more wireless receiver nodes or stations, the PSMP frame comprising:
a unicast information field for each of one or more unicast transmissions, the unicast information field comprising at least a station ID, a downlink transmission time or start offset for the unicast transmission, and a downlink transmission duration for the unicast transmission; and
a plurality of station info fields, a station info field for a multicast transmisson comprising a field indicating multicast, a downlink transmission time or start offset for the multicast transmission, a downlink transmission duration for the multicast transmission, and a multicast address.

14. An apparatus, the apparatus comprising:
a wireless transceiver; and
a controller, the controller configured to:
 transmit a Power save multi poll (PSMP) frame via a wireless network to indicate a data transmission schedule for one or more wireless receiver nodes or stations, the PSMP frame comprising:
  a unicast information field for each of one or more unicast transmissions, the unicast information field comprising at least a station ID, a downlink transmission time or start offset for the unicast transmission, and a downlink transmission duration for the unicast transmission; and
  a plurality of station info fields, a station info field for a multicast transmission comprising a field indicating multicast, a downlink transmission time or start offset for the multicast transmission, a downlink transmission duration for the multicast transmission, and a multicast address.

15. The apparatus of claim 14 wherein the PSMP frame comprises an IEEE 802.11n PSMP frame.

16. A method comprising:
receiving, by a wireless node in a wireless network, a Power save multi poll (PSMP) frame that identifies one or more parameters relating to a multicast transmission to be transmitted, the PSMP frame comprising a plurality of station info fields, a station info field for the multicast transmission comprising:
 a first field set to a value indicating a multicast transmission;
 a second field identifying a multicast address;
 a third field identifying a time for the multicast transmission; and
 a fourth field identifying a duration for the multicast transmission.

17. An apparatus provided in a wireless node of a wireless network, the apparatus being configured to:
receive a broadcast Power save multi poll (PSMP) frame that identifies a scheduled multicast data transmission time, the broadcast PSMP frame comprising a plurality of station info fields, a station info field for a multicast transmission comprising a first field set to a value indicating multicast, a second field identifying a selected one of a plurality of possible multicast addresses, a downlink transmission start offset indicating a time for the multicast data transmission, and a downlink transmission duration indicating a duration for the multicast data transmission.

* * * * *

UNITED STATES PATENT AND TRADEMARK OFFICE
CERTIFICATE OF CORRECTION

PATENT NO. : 7,751,396 B2  
APPLICATION NO. : 11/709410  
DATED : July 6, 2010  
INVENTOR(S) : Naveen K. Kakani Page 1 of 1

It is certified that error appears in the above-identified patent and that said Letters Patent is hereby corrected as shown below:

In column 11, line 20, in claim 1, delete "transmisson" and insert -- transmission --, therefor.

In column 11, line 44, in claim 3, before "wireless" delete "a" and insert -- the --, therefor.

In column 11, line 51, in claim 4, delete "transmisson" and insert -- transmission --, therefor.

In column 12, line 15, in claim 7, delete "transmisson" and insert -- transmission --, therefor.

In column 12, line 40, in claim 10, delete "transmisson" and insert -- transmission --, therefor.

In column 12, line 65, in claim 13, delete "transmisson" and insert -- transmission --, therefor.

Signed and Sealed this  
Twenty-ninth Day of May, 2012

David J. Kappos  
*Director of the United States Patent and Trademark Office*